FREQUENCY CONVERSION SYSTEM

Filed April 23, 1963 12 Sheets-Sheet 1

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

INVENTOR.
PHILIP D. COREY
BY Isidore Match
HIS ATTORNEY

June 6, 1967 P. D. COREY 3,324,374

FREQUENCY CONVERSION SYSTEM

Filed April 23, 1963 12 Sheets-Sheet 12

INVENTOR.
PHILIP D. COREY
BY Isidore Match
HIS ATTORNEY

United States Patent Office 3,324,374

Patented June 6, 1967

3,324,374
FREQUENCY CONVERSION SYSTEM

Philip D. Corey, Waynesboro, Va., assignor to General Electric Company, a corporation of New York Filed Apr. 23, 1963, Ser. No. 275,096
22 Claims. (Cl. 321—5)

Figure 1:
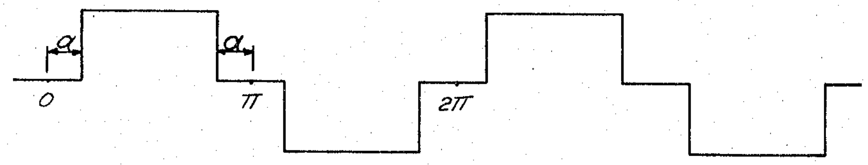

This invention relates to power conversion systems. More particularly, it relates to conversion systems wherein a single or polyphase power input of one frequency is converted to a stepped wave single phase or polyphase power output of another frequency, such output containing an advantageously low proportion of harmonics and being pulse-width modulated in accordance with its deviation from a desired output voltage value.

Heretofore, in power conversion systems wherein a single phase or polyphase alternating current power input of one frequency has been converted to a single phase or polyphase alternating current power output of another frequency, the common practice has been to convert suitably the polyphase input to a unidirectional signal and then to apply a square wave voltage of the aforesaid other frequency and the unidirectional power to a power inverter to produce a square wave power output in accordance with the square wave voltage. In such system, silicon controlled rectifiers have been advantageously utilized as power switching elements because of their ruggedness, high current handling capacity and long life. In comparatively low power applications, transistors have been suitably utilized as the power switching elements. The square wave power output is then filtered in a suitable low pass filter.

However, the output square waves of these power inverters are extremely rich in harmonics, especially low order harmonics which also have a relatively high amplitude. Consequently, the output filters in these power conversion systems have heretofore had to be very heavy to produce a satisfactory relatively pure sinusoidal output.

These heavy filters may weigh as much as 20 percent of the total weight of a frequency conversion system. Of course, the heavier the filters, the more expensive they are and the more problems presented by their weight. Since there are many situations such as in aircraft where extra weight allowance is at a premium and since expense is an ever present factor which must be considered, it would be extremely desirable to have a power conversion system wherein the output filter can be eliminated or at least greatly decreased in weight.

Also, heretofore, in power conversion systems, special type circuitry generally has had to be included therein to provide voltage regulation of the output. A common technique for effecting such regulation has been the pulse-width modulation of the output power square wave. To accomplish such modulation, there generally has to be included output voltage sensing circuitry and circuit arrangements responsive to such circuitry for varying the pulse width of the output of the power inverter in accordance with the deviation of the output voltage from a desired value. Such pulse-width modulation circuitry has generally required the use of a separate set of switching devices with the consequent complication of the circuitry comprising the total system and the increase in weight and expense entailed thereby.

Accordingly, it is an important object of this invention to provide a power conversion system for converting a single or polyphase alternating current power input of one frequency to a single or polyphase alternating current power output of another frequency wherein the filters that are required therefor, if any, are substantially reduced in weight as compared to the weight of filters utilized in presently known power conversion systems.

It is another object to provide a power conversion system in accordance with the preceding object wherein there is produced a stepped wave power output having the desired output frequency, such stepped wave output having substantially no triplet harmonics and no lower order harmonics and only small amounts of higher order harmonics.

It is a further object to provide a power conversion system in accordance with the preceding objects wherein there is produced the aforesaid stepped wave free of the hereinabove set forth harmonics and in addition is pulse-width modulated in accordance with the deviation of the output voltage from a desired voltage, the producing of such modulated stepped wave being effected by a single set of devices which are utilized both for power switching and pulse width modulation.

In accordance with the invention, there is provided a system for converting the output of an alternating current power source, single or polyphase, to a balanced three-phase quasi-square wave system output of a given frequency which is variably pulse-width modulated in accordance with the deviation of the system output from a desired value while maintaining the output free of triplet harmonic components comprising rectifying means in circuit with the source to produce a unidirectional power supply, and generating means in circuit with a portion of the supply for producing a first reference square wave and second to sixth like square waves progressively 60° displaced in phase and having theaforesaid given frequency. A voltage representing the desired value and a representative voltage derived from the output are compared in a voltage comparison means to provide a difference voltage therebetween. Means are further included for providing a phase shift of 0° to 60°, the second, fourth and sixth waves and the difference voltage being applied to the phase shift means to shift the phase of these waves in accordance with the difference voltage. Included in circuit with the generating means and the phase shift means are means for respectively phasorially adding the first, third and fourth waves, the first, second and fifth waves, and the third, fifth and sixth waves to produce balanced phase first, second and third resultant waves. First, second and third like inverters are provided to which the first, second and third resultant waves are applied as switching waveforms and to which the unidirectional potential is applied for its conversion to square power waves in accordance with the configuration of the switching waveforms. Means are provided in circuit with the outputs of the inverters for respectively phasorially adding in 60° phase displacement the outputs of the first and second inverters, the outputs of the first and third inverters, and the outputs of the second and third inverters to produce three like balanced phase quasi-square wave outputs.

Also, in accordance with the invention, there is provided a system for converting the output of an alternating current power source, single or polyphase, to a balanced three-phase quasi-sinusoidal stepped wave output having a given frequency which is regulated in accordance with the deviation of the system output from a desired value while maintaining the output free of all triplet and other harmonic components comprising rectifying means in circuit with the source to produce a unidirectional power supply, generating means in circuit with a portion of the supply for producing a first reference square wave and second to sixth like square waves having the aforesaid given frequency and being respectively progressively 60° displaced in phase. A reference voltage having a value representing the desired system output and a voltage representative of the system output are compared in voltage comparison means to produce a difference voltage therebetween. The difference voltage and the second, fourth, and sixth waves are applied to a phase shifter which produces a 0° to 60° phase shift in accordance with the difference voltage. Provided in circuit with the generating means and the first phase shift means are means for phasorially adding the first, second and fifth waves, the first, third and fourth waves and the third, fifth and sixth waves to produce balanced-phase first, second and third resultant waves. A second phase shift means for producing a 30° phase shift is included, the resultant waves being applied to this second phase shift means to produce first, second and third 30° phase shifted resultant waves.

In the inversion portion of the foregoing system, there are included first to sixth like inversion means, each of the inversion means including at least a pair of complementary switching devices. The three resultant waves are respectively applied as switching waves to the first, second and third inversion means and the three phase shifted resultant waves are applied as switching waves to the fourth, fifth and sixth inversion means, the unidirectional potential being applied across all of the inversion means. Such application produces from the inversion means a first reference power wave and second to sixth like power waves 30°, 120°, 150°, 180°, 240° and 270° displaced in phase with respect to the first power wave. Second adding means are included in circuit with the outputs of the inversion means for phasorially adding at 60° phase displacement the first and third, the first and fifth, the third and fifth, the second and fourth, the second and sixth and the fourth and sixth power waves to produce first to sixth quasi-square power waves displaced in phase correspondingly as the first to sixth power waves. Provided in circuit with the second adding means are means for producing first, second and third derived quasi-square power waves having $\sqrt{3}$ times the value of the first, second and third power waves. Third adding means are provided in circuit with the output of the derived quasi-square power wave producing means and the second adding means for phasorially adding the first derived quasi-square power wave and the fourth and fifth power waves, the second derived quasi-square wave and the fifth and sixth power waves and the third derived quasi-square power wave and the fourth and sixth quasi-square power waves, the quasi-square power waves being added to a derived quasi-square power wave respectively in a phase 30° advanced and 30° retarded with respect thereto.

The novel features, which are believed to be characteristic of this invention, are set forth with particularity in the appended claims. The invention itself, however, both as to its organization and method of operation together with other and further objects thereof may best be understood when taken in connection with the accompanying drawings.

Figure 2:
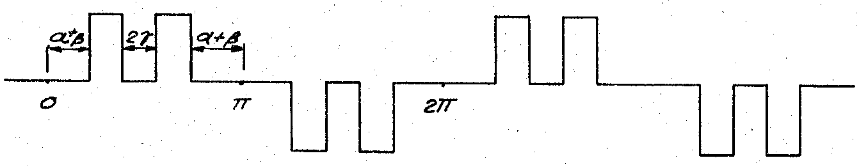
Figure 3:
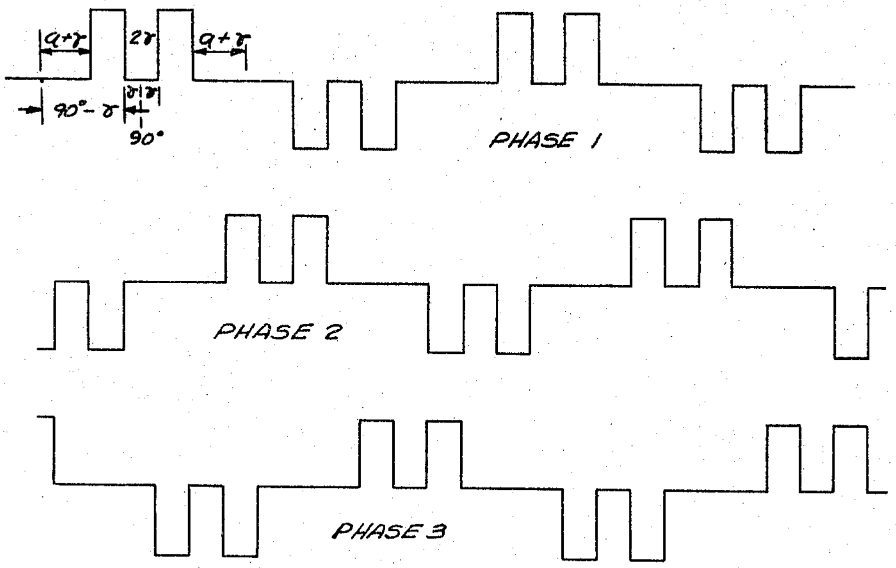
Figure 4:
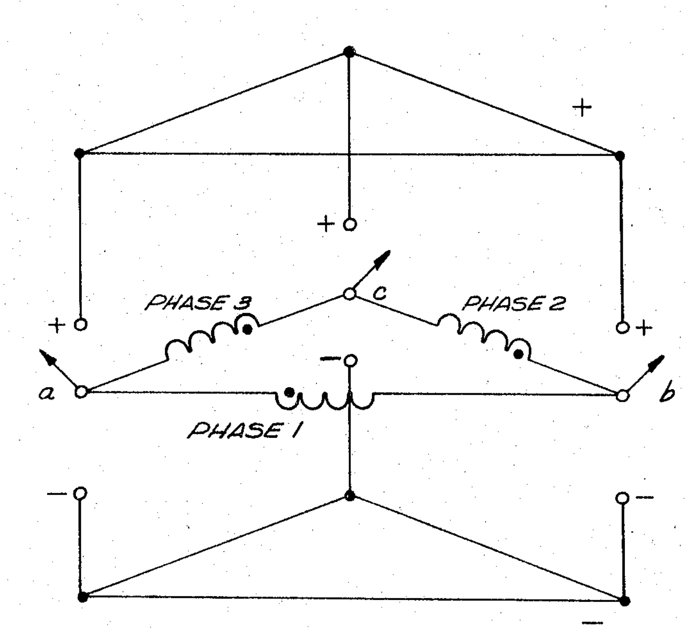
Figure 5:
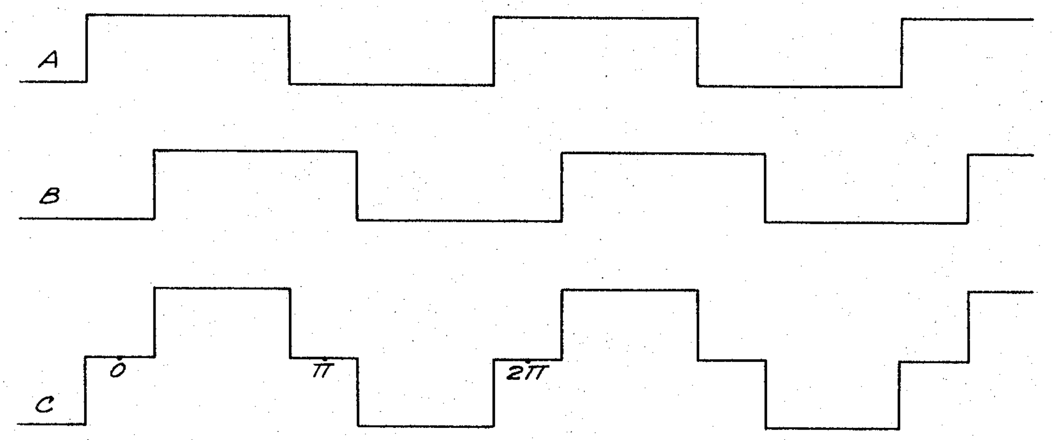
Figure 6:
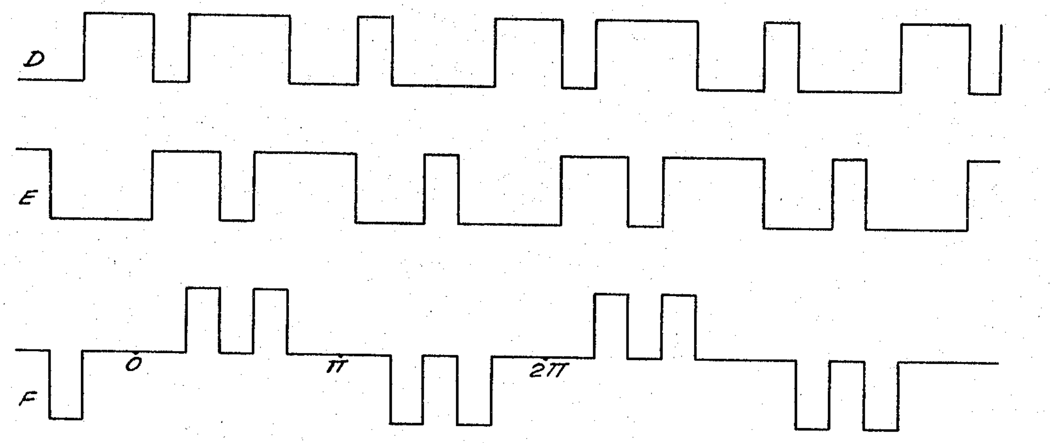
Figure 7:
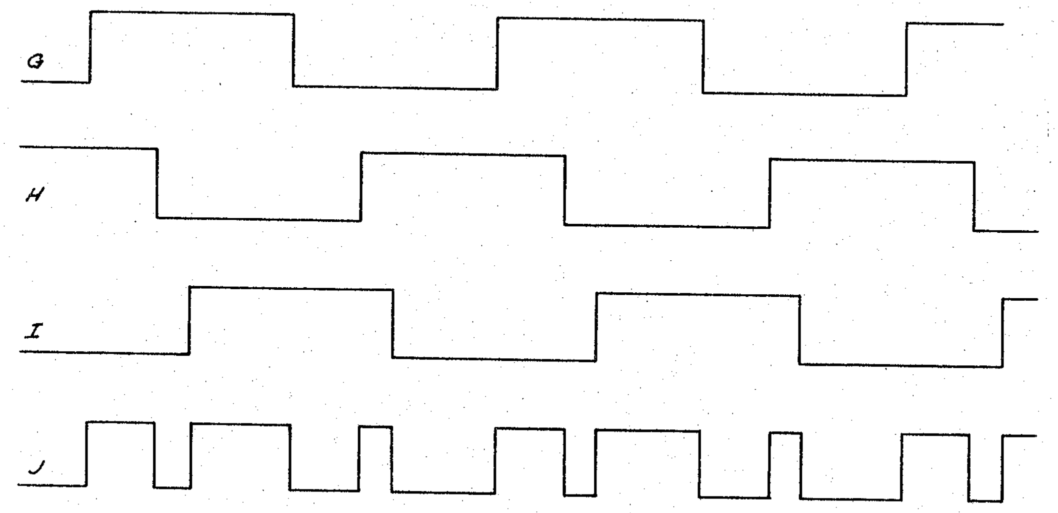
Figure 8:
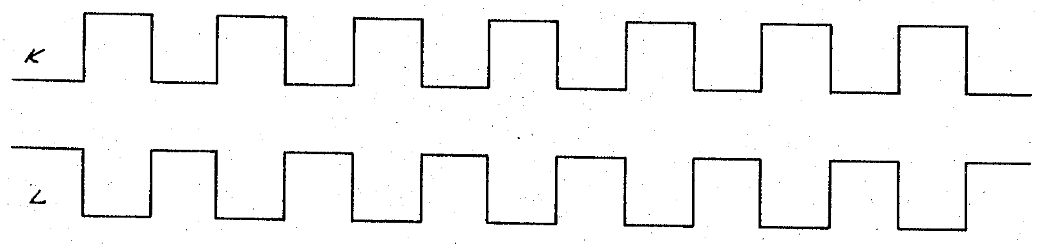
Figure 9:
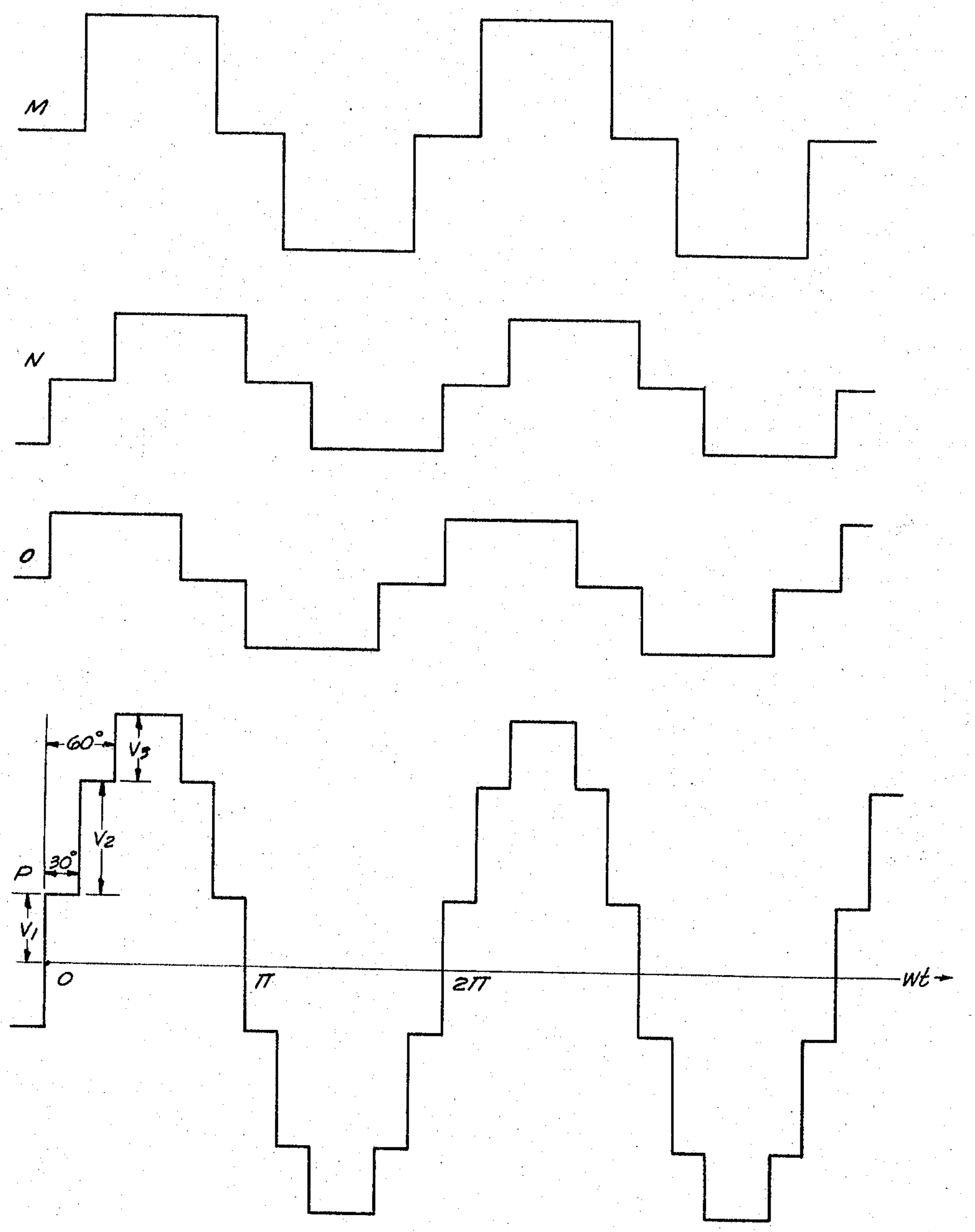
Figure 10:
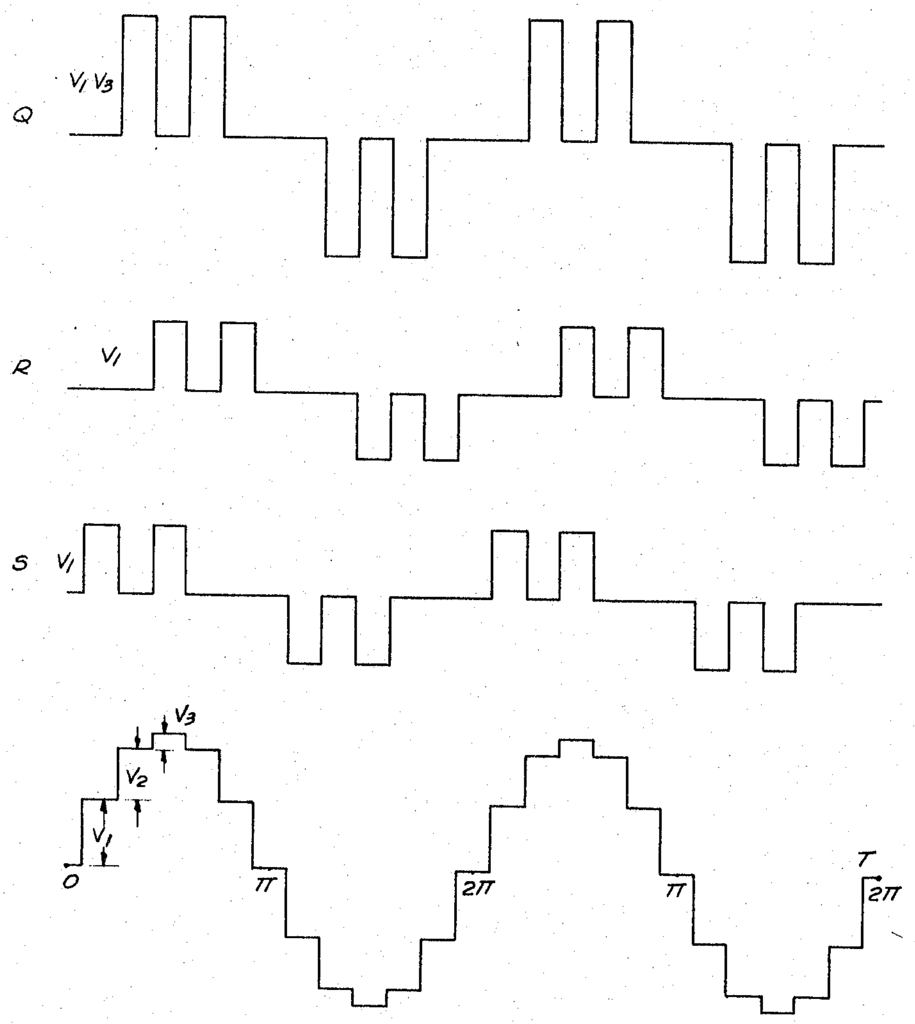
Figures 11, 12, 13:
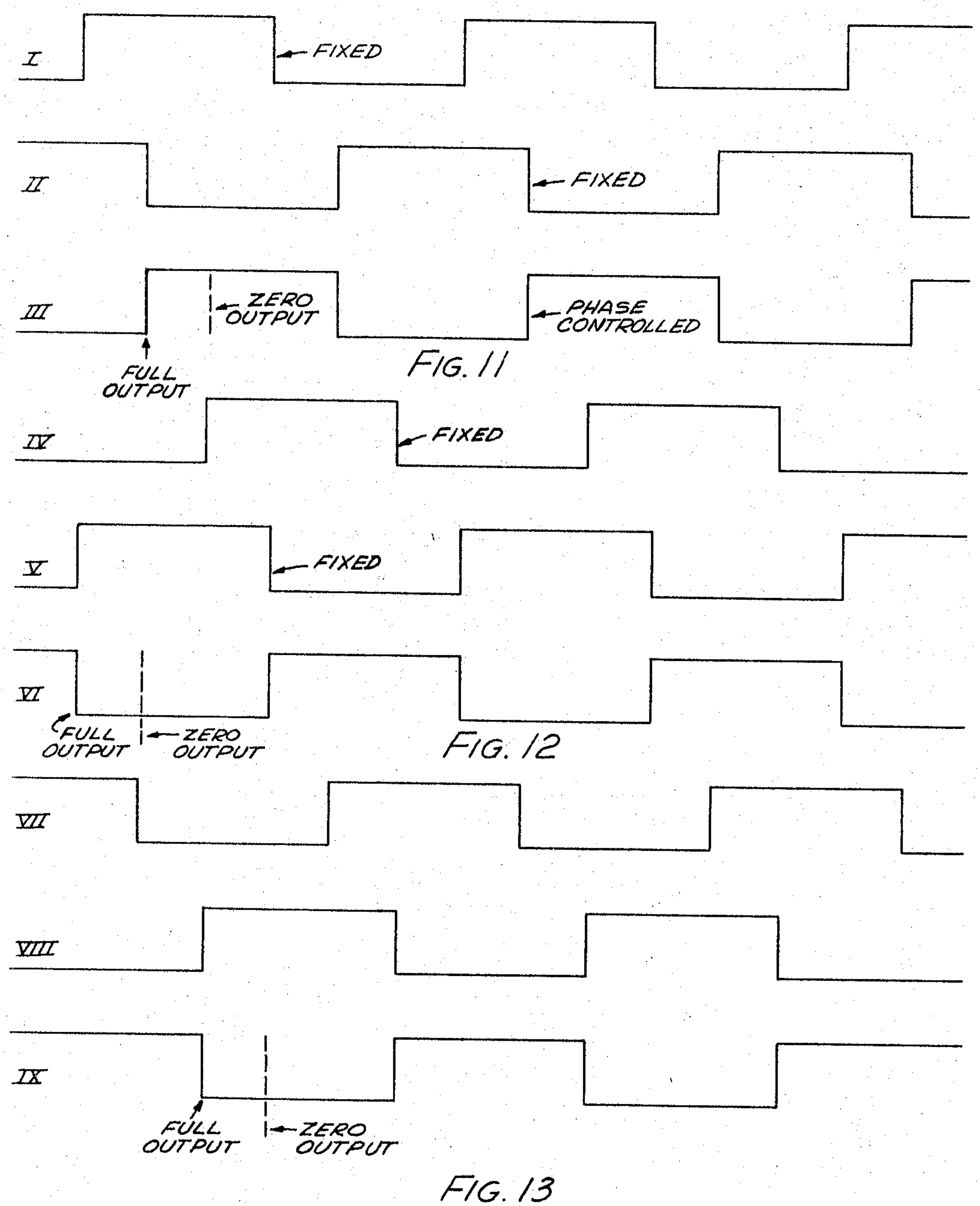
Figure 14:
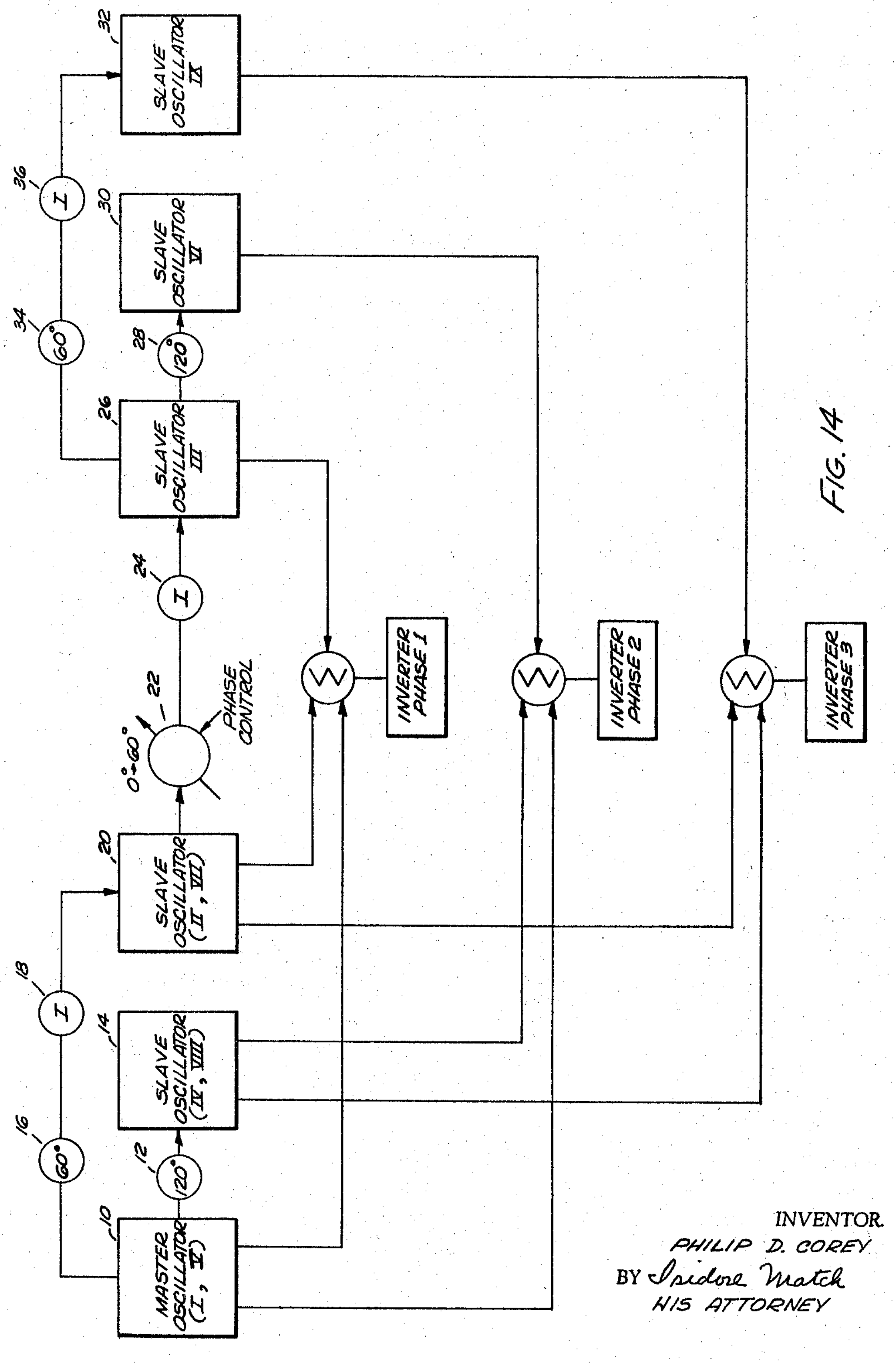
Figures 15, 16, 17:
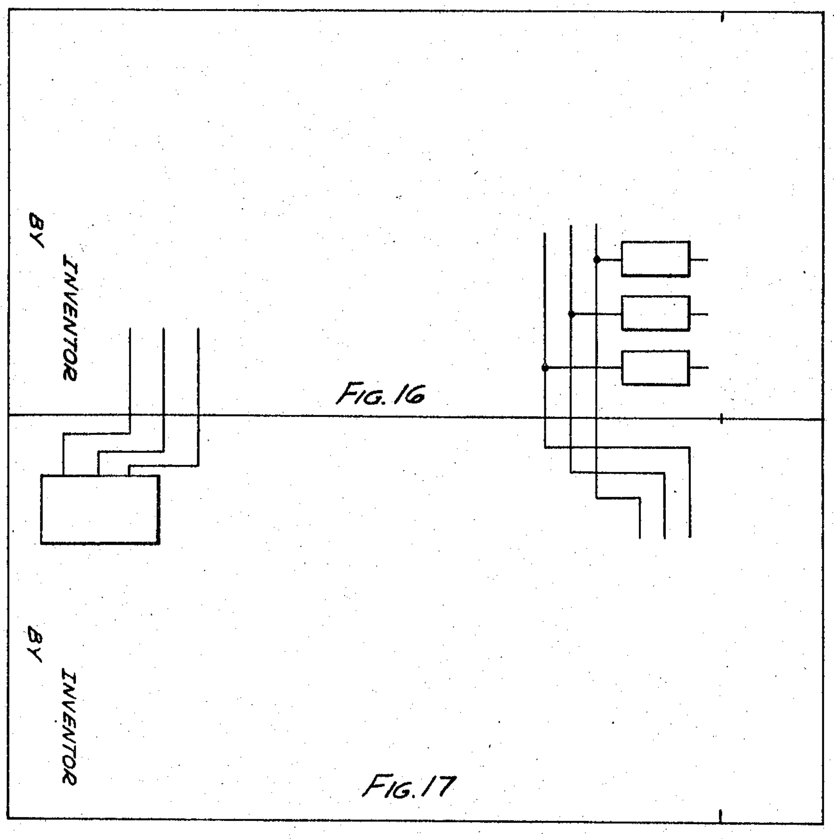
Figure 16:
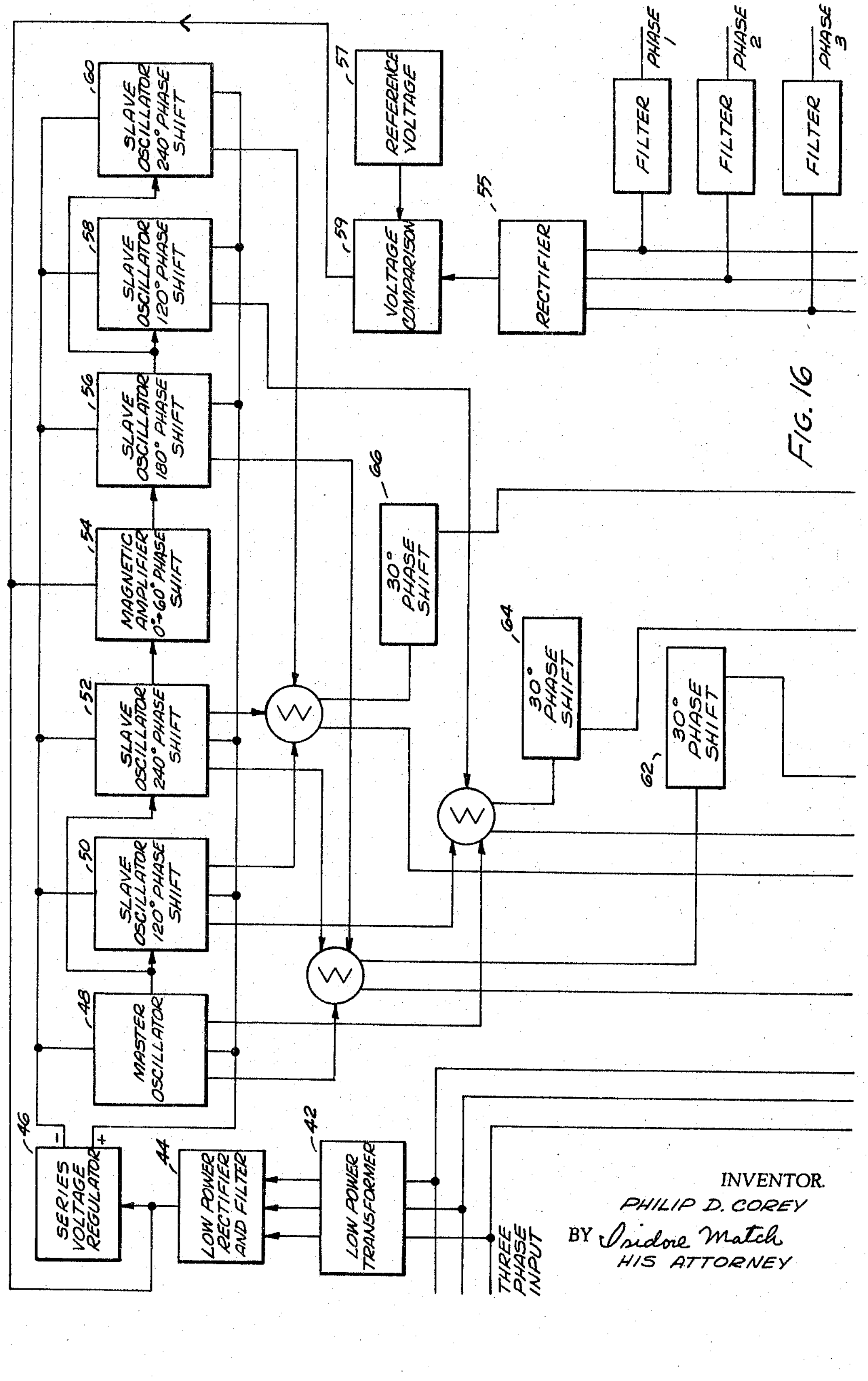
Figure 17:
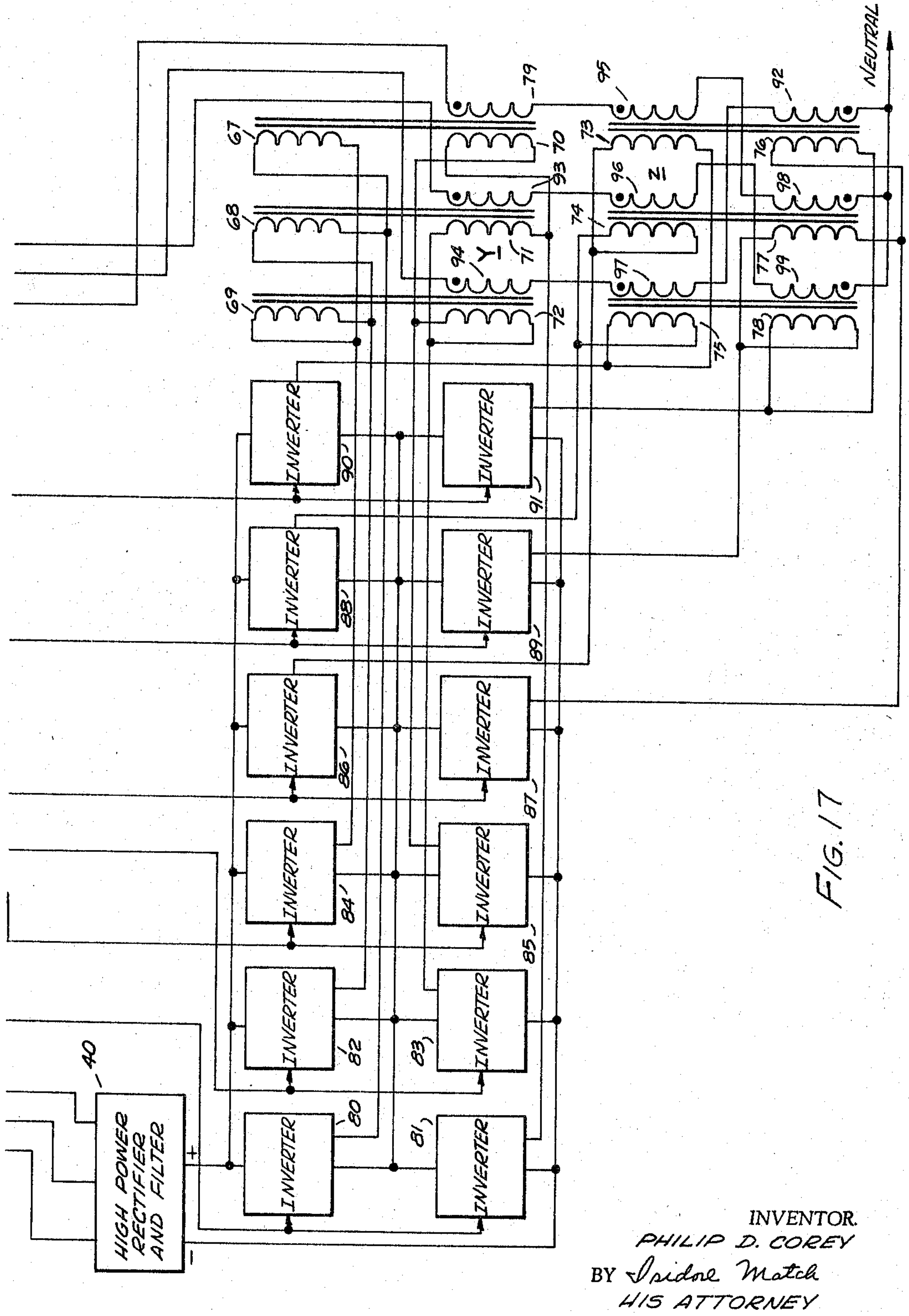
Figure 18:
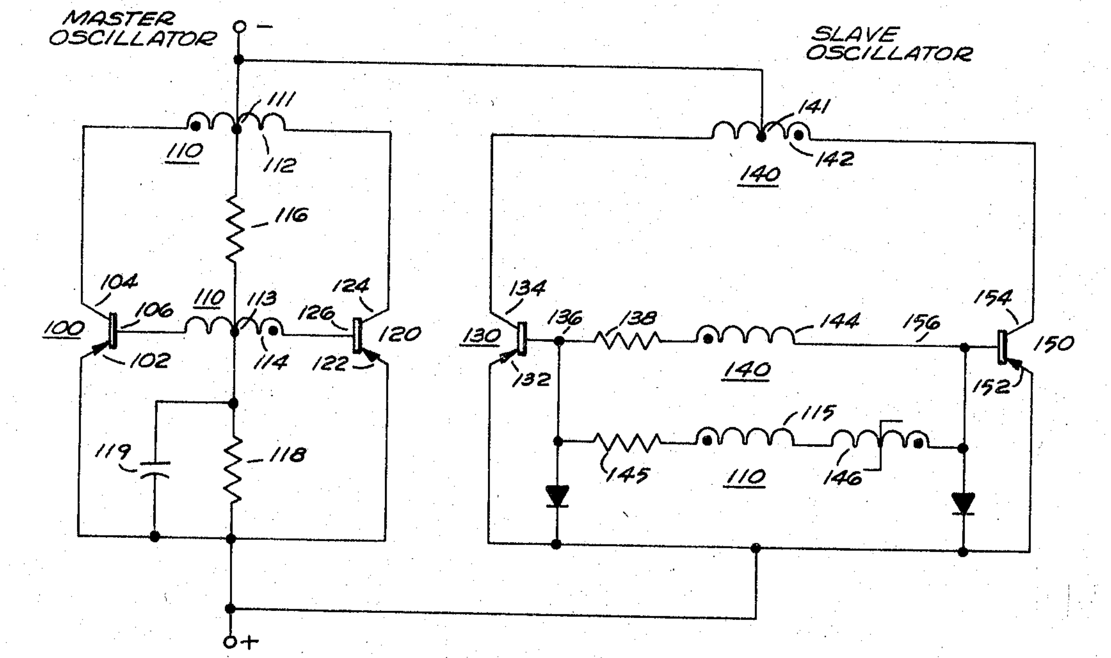
Figure 19:
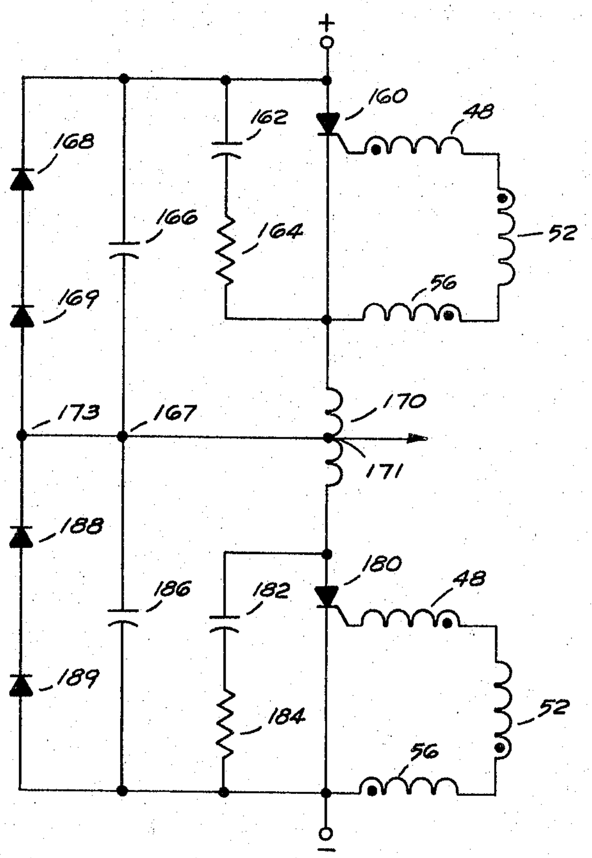

In the drawings, FIG. 1 depicts a symmetrical quasi-square wave having a chosen dwell angle for effecting a given harmonic cancellation;

FIG. 2 is a diagram of a notched quasi-square wave wherein said given harmonic cancellation is maintained;

FIG. 3 comprises a timing diagram of three balanced phase waveforms of the type shown in FIG. 2;

FIG. 4 conceptually depicts three single pole double throw switches having no center off positions used to connect the delta connected primary windings of a three phase transformer between the positive and negative terminals of a unidirectional power supply;

FIG. 5 comprises a timing diagram of a pair of like square waves in a given phase relationship and the resultant of their phasorial addition;

FIG. 6 comprises a timing diagram of a pair of like notched square waves in a given phase relationship and the resultant of their phasorial addition;

FIG. 7 comprises a timing diagram of three like square waves in a given phase relationship and the resultant of their phasorial addition;

FIG. 8 comprises a timing diagram of two complementary square waves;

FIG. 9 comprises a timing diagram of three quasi-square waves in a given phase relationship and the resultant of their phasorial addition;

FIG. 10 comprises a timing diagram of three notched quasi-square waves in a given phase relationship and the resultant of their phasorial addition;

FIGS. 11, 12 and 13 each comprise timing diagrams of three waveforms, the resultants of their phasorial additions respectively thereof being 120° displaced in phase with respect to each other;

FIG. 14 is a diagram of an arrangement for producing the switching waveforms in the system;

FIGS. 16 and 17 taken together as in FIG. 15 is a diagram, essentially in block form, of a system constructed in accordance with the principles of the invention;

FIG. 18 is a schematic diagram of a square wave generating arrangement suitable for use in the system of FIGS. 15 to 17; and FIG. 19 is a schematic diagram of a static inverter suitable for use in the system of FIGS. 15 to 17.

The fundamental component of the classic symmetrical quasi-square wave as shown in FIG. 1 may be expressed by the following equation:

$$e=\frac{4V}{\pi}\sum_{n}\cos n\alpha\,\frac{\sin n\omega t}{n} \qquad (1)$$

wherein $n$ is an odd number, V is the amplitude of the D.C. source voltage in volts, $\alpha$ is the dwell angle in degrees and $\omega$ is the fundamental angular frequency of the output voltage.

The third harmonic component of this "classic" quasi-square wave is expressed by the term:

$$A_3=\frac{4V}{\pi}(\cos 3\alpha)\frac{\sin 3\omega t}{3} \qquad (2)$$

It is readily seen that if $\alpha$ is made to equal 30°, the third harmonic component of the wave of FIG. 1 will be zero.

Now if the dwell angle $\alpha$ is made to be other than 30° by the parameter $+\beta$, the component of the third harmonic will now be:

$$A_3=\frac{4V}{\pi}\cos 3(30°+\beta)\frac{\sin 3\omega t}{3} \qquad (3)$$

With the dwell angle of $(30°+\beta)$ and a notch taken out of the center of the wave having a width $2\gamma$ a wave having such dwell angle and such notch as illustrated in FIG. 2, the mathematical expression for the fundamental component of this wave is given by:

$$\frac{4V}{\pi}[\cos(30°+\gamma)-\sin\gamma]\sin\omega t A_1 \qquad (4)$$

where $\gamma$ is between 0 and 30°. The third harmonic of this wave is given by the expression:

$$A_3=\frac{4V}{\pi}[\cos(90°+3\gamma)-\cos(270°-3\gamma)]\frac{\sin 3\omega t}{3}=0 \qquad (5)$$

It is seen that in Equation 5 the following relationship obtains; if in Equation 3, the expression for the third harmonic of the wave of FIG. 2, i.e., $A_3$ is made equal to zero, then the equation is satisfied when $\beta=\gamma$. From the foregoing, it is appreciated that pulse width modulation control of the fundamental [Equation 4] is made possible by making angle $\beta$ to always equal angle $\gamma$. It is also evident that if, for example, angle $\alpha$ is chosen to be 30°, then the triplet harmonics are identically zero over the total control range of the $\gamma$ angle. Accordingly, it is seen that pulse-width modulation to control the amplitude of the fundamental of the quasi-square wave can be effected and at the same time the triplet harmonics can be eliminated. The waveform of FIG. 2 is one in which, if angle $\alpha$ is chosen to be 30° angle $\beta$ is equal to angle $\gamma$.

FIG. 3 comprises a timing diagram of three waveforms such as depicted in FIG. 2 which are 120° displaced in phase. The sum of the voltages in these waves is exactly zero at all instances of time regardless of the value of control angle $\gamma$. This signifies that a three-phase system having this waveform can excite a three-phase E-core transformer, a three-phase motor, or any similar three phase device which takes advantage of the zero instantaneous voltage summation inherent in sine wave three-phase systems.

In FIG. 4 there is conceptually shown a sketch of three single pole, double throw switches which are utilized to connect the delta connected primary windings of a three phase transformer between the + and − terminals of a unidirectional potential power supply. It is to be noted that these switches have no "center-off" positions. Consequently, the voltages in these primary windings will be controlled by the instantaneous switch positions only, and will not depend on electrical load magnitude and power factor conditions. A voltage which is controlled by the instantaneous switch position only may conveniently be designated as a "constrained voltage." In FIG. 4, the switches have been conceptually depicted as electro-mechanical switches. However, they may suitably be the complementary switching devices in inverter circuits. Since the depicted switches have no "center-off" positions, if their function is provided by inverter circuits, such circuits should preferably be of the type wherein the rendering conductive of one switching device therein causes the rendering nonconductive of a complementary switching device therein, i.e., "up and down" inversion action. This type of arrangement consequently permits the elimination of the output transformer since the load voltage may be positively regulated with respect to a system reference point without requiring a transformer to provide such point. This can be understood when it is realized that in such "up and down" type inverter, the load can be connected between the junction of the series arranged switching devices and the midpoint of the unidirectional supply.

As has been described hereinabove, each of the waveforms of FIGS. 2 and 3 achieves the same cancellation of triplet harmonics as the waveform of FIG. 1 but are also pulse width modulated, i.e., the total percentage harmonic content of the waves of FIGS. 2 and 3 varies as a function of the control angle, $\gamma$; however, the optimal harmonic cancellation is still maintained.

To produce the waveform of FIG. 1 assuming that it is desired to have the dwell angle $\alpha$ equal to 30° whereby all of the odd number triplet harmonics are eliminated therefrom, two square waves A and B, 60° displaced in phase, may be phasorially added as shown in FIG. 5 to produce waveform C. Waveform C of this figure can be taken to represent maximum output of an inverter system and has no triplet harmonic components therein. To pulse width modulate waveform C and still have zero triplet harmonics, the amount by which the dwell angle is increased has to equal one half of the notch therein.

Thus, let it be assumed that the notch in the waveforms of FIGS. 2 and 3 is equal to 30° whereby angle $\gamma$ is equal to 15°. Consequently, angle $\beta$ must also be equal to 15°. FIG. 6 shows that to provide the waveforms of FIGS. 2 and 3, i.e., waveform F, two waveforms such as D and E have to be phasorially added. It is seen in this figure that waveforms D and E are 60° displaced in phase and that each half cycle thereof has a 30° notch between the 60° and 90° points. Waveform F consequently has dwell angles of 45° and notches of 30°.

To produce a waveform such as waveforms D or E of FIG. 6, three square waves G, H and I are vectorially added as shown in FIG. 7 to provide waveform J. In this figure, waveforms G and H and I are like square waves, G and H being 240° displaced in phase and waveforms H and I being 210° displaced in phase.

If the notch taken in the quasi-square wave is equal to 60°, then the output of the inverter is zero since there result the waveforms K and L of FIG. 8. When such waveforms, 60° displaced in phase, are phasorially added, the resultant is zero. From the foregoing, it is seen from FIG. 7 that full output results when waveforms H and I are 180° displaced in phase and that this output can be progressively decreased to zero by further correspondingly retarding the phase of waveform I with respect to waveform H from zero to 60°.

It can now be appreciated that three like square waves such as shown in FIG. 7 can be phasorially added in the phase relationships as shown therein to produce waveform such as J and the waveform J can be utilized as the switching waveform to an inverter in an inversion system. In a three phase system, three waveforms such as waveform J are derived 120° displaced in phase with respect to each other. Consequently, a three phase output is obtained due to inverter action, the three phase outputs also having the same form as waveform J. The phasorial addition of a pair of inverter output waveforms such as the form of waveform produced by the phasorial addition of waveforms such as G, H and I can result in maximum output such as shown in FIG. 1, an output having the waveform of FIGS. 2 and 3 wherein a 30° notch, for example is taken in the waveform of FIG. 1 and zero output when such notch is equal to 60°.

In FIG. 9, there is shown the twelve step quasi-sinusoidal wave P which results from the phasorial summation of three waves such as shown in FIG. 1. In this figure, waveform M is 30° advanced in phase with respect to waveform N and 30° retarded in phase with respect to waveform O and, as will be further explained hereinbelow, its amplitude is chosen to be equal to $\sqrt{3}$ times the amplitude of waveforms N and O.

This P type waveform is a waveform that has no dwell at zero voltage and has twelve equal width steps. If the rule is taken that all step riser heights should be twice the height of the first step times the cosine of the angle to each step measured from $\omega t=0$, then mathematically, $V_k=2V_1 \cos \theta_k$ wherein $V_k$ is step riser amplitude, $V_1$ is amplitude of the first step and $\theta_k$ is the aforesaid angle measured from $\omega t=0$. Thus $V_2=2V_1 \cos 30°=1.732V_1$ and $V_3=2V_1 \cos 60°=V_1$.

In waveforms M, N and O, there are no triplet harmonics and the lowest harmonics contained therein are the fifth, seventh and eleventh. Now, when waveforms M, N and O are phasorially added as with the heights (amplitudes) selected for $V_1$, $V_2$ and $V_3$, the fifth and seventh harmonics drop out and the result is that in waveform P, there is a complete cancellation of all harmonics below the eleventh (9.1%), the thirteenth (7.7%), the twenty-third (4.35%), the twenty-fifth (4%), etc. The expression for waveform P is:

$$e=\frac{4}{\pi}\sum_{n=\text{odd}}(V_1+V_2 \cos n\theta_1+V_3 \cos n\theta_2)\frac{\sin n\omega t}{n} \qquad (6)$$

and confirms the foregoing harmonic cancellation.

In FIG. 10, waveform T shows the stepped wave that results when the three waveforms Q, R and S are phasorially added, waveforms Q, R and S being such as those shown in FIGS. 2 and 3. As in FIG. 9, waveform Q has a voltage amplitude equal to the $\sqrt{3}$ times the amplitude of the voltage of waveforms R and S. Also, it leads waveform R by 30° and lags waveform S by 30°. Waveform T is an equal width twelve step waveform with a dwell at zero equal to one step width. The general rule for this waveform is that all step riser heights have to be proportioned to the cosine of the angle to each respective step, measured from $\omega t=0$ or $$V_k=V_1\frac{\cos\theta_k}{\cos\theta_1}$$

wherein $V_1$ is the voltage of the first step riser, $\theta_k$ is the aforesaid measured angle and $\theta_1$ is the dwell angle. Thus $$V_2=V_1\ (\cos 75°/\cos 15°)=0.732\ V_1$$

and $$V_3=V_1\ (\cos 75°/\cos 15°)=0.268\ V_1$$

The expression for waveform T is $$e=\frac{4}{\pi}\sum_{n=odd}(V_1\cos n\theta_1+V_2 n\cos\theta_2+V_3 n\cos\theta_3)\frac{\sin n\omega t}{n} \tag{7}$$

wherein $\theta$=the angle measured from $\omega t=0$.

It is seen from the values of the amplitudes given for waveforms Q, R and S that in waveform T $$V_2=\sqrt{3V_1}-V_1=0.723\ V_1$$

and that $$V_3=2V_1-\sqrt{3V_1}=0.268\ V_1$$

Equation 7 confirms that waveform T contains only the same harmonics as waveform P in FIG. 9 and results from pulse-width modulation of the classic symmetrical quasi-square wave.

FIGS. 11, 12 and 13 show the phase relationships required of square waveforms that are phasorially added in accordance with the depiction of FIG. 7 to produce three waveforms such as waveform J therein respectively 120° displaced in phase. It is seen in these figures that waveforms I, IV and VII are progressively 120° displaced in phase and that waveforms I and V, II and VII and IV and VIII are respectively in phase. Also, with maximum output from the inverter, waveform III, waveforms VI and IX are the complements of waveforms II, V and VIII respectively. Thus, there is required the generation of wave forms I, V and VIII and means to vary the phase displacement of waveforms III, VI and IX with respect to waveforms I, IV and VII respectively.

FIG. 14 is a block depiction showing how the waveforms of FIGS. 11, 12 and 13 may be generated and combined to produce three switching waveforms for the inverter of a three phase system such as waveform J of FIG. 7 and 120° displaced in phase. In the arrangement of this figure, the square wave output of a master oscillator 10 provides waveforms I and V. The output of master oscillator 10 is applied as a driving signal to a slave oscillator 14 through a 120° phase shifter 12 to produce at the output thereof waveforms IV and VIII which are 120° retarded in phase with respect to the output of oscillator 10. The output of master oscillator 10 is also applied to a slave oscillator 20 through a 60° phase shifter 16 and an inverter 18 to produce at the output of oscillator 20, square waves II and VII which are 240° displaced in phase with respect to the output of oscillator 10. The output of oscillator 20 is applied to slave oscillator 26 through a variable phase control which imparts a 0 to 60° phase retardation to the output of oscillator 20, and an inverter 24. Thus the output of slave oscillator 26 is from 180° to 240° retarded in phase with respect to the output of oscillator 20, this output being waveform III. Similar to the operation of oscillators 10, 14 and 20, phase shifters 28 and 34 and inverter 36 operate to produce outputs from slave oscillators 30 and 32 which are 120° and 240° displaced in phase with respect to the output of oscillator 26, viz., waveforms VI and IX. Respective combinations of waveforms I, II and III, IV, V and VI and VII, VIII and IX are combined as shown in FIGS. 11 to 13 to provide the switching waveforms for the inverters in a three phase system.

FIGS. 16 and 17 taken together as in FIG. 15 depict an illustrative embodiment of a three phase frequency conversion system constructed in accordance with the principles of the invention wherein the waveforms discussed described hereinabove are produced. In these figures, there is depicted a system which converts a three phase power input of one frequency to a three phase power output of a different frequency. However, it is to be understood that the principles of the invention apply to systems wherein a polyphase power input may be connected to a single phase or a polyphase output, and wherein a single phase or unidirectional input may be converted to a single or polyphase output.

In the arrangement of FIGS. 15 to 17, a polyphase input such as a three phase input having a frequency which it is desired to convert to a three phase output of a chosen frequency is applied to a three way rectifier and filter stage 40 wherein the inputs are rectified and combined and filtered in a suitable low pass filter to provide at the output thereof, the unidirectional potential supply which is to be converted to the system output. The three phase input is also applied to a three phase low power transformer 42 and the outputs of transformer 42 are applied to a three way rectifier and filter 44 wherein the outputs of transformer 42 are rectified, combined and filtered. The output of stage 44 is a unidirectional potential that is utilized as the supply voltage for the oscillators of the system.

The unidirectional potential output of stage 44 is applied to a series voltage regulator 46 whereby at the output of regulator stage 46 there is provided a voltage of a substantially constant voltage. Voltage regulator stage 46 may suitably be an arrangement wherein a reference element such as a Zener diode is utilized to provide a chosen voltage value and the input voltage from stage 44 is compared thereagainst and any difference therebetween is fed back to active stages in the regulator to insure that the output voltage of the regulator substantially always matches the voltage across the reference diode.

This regulated voltage is applied as a supply voltage to an oscillator 48 which produces a square wave output having the desired frequency of the system output. Oscillator 48 may suitably be of the magnetic coupled type, such oscillator having an output frequency which is directly dependent upon the supply voltage applied thereto. As will become apparent hereinbelow, oscillator 48 may be conveniently designated as the master oscillator.

The output of master oscillator 48 is applied to a slave oscillator 50 through a 120° phase shift arrangement and to a slave oscillator 52 through a 240° phase shift arrangement whereby the outputs of oscillators 50 and 52 are 120° and 240° displaced in phase with respect to the output of master oscillator 48. A phase shift arrangement may suitably be volt-second element, such as a saturable reactor, which is in circuit with a driving secondary winding of the output transformer of a preceding oscillator and a secondary winding poled in a chosen direction of the transformer of the oscillator whose output is shifted in phase. The phase shift in slave oscillator 50 is chosen to impart a 120° delay. To provide a 240° phase retardation of the output of master oscillator 48 in the output of slave oscillator 52, there may be utilized a volt-second element which imparts a 60° delay and the polarity of the windings of the output transformer of slave oscillator 52 may be chosen as to invert its output to provide a total 240° phase shift.

The output of slave oscillator 52 is applied to a slave oscillator 56 through a volt-second device, suitably a magnetic amplifier 54, which may variably supply a zero to 60° phase shift to the output of slave oscillator 52. The output of slave oscillator 56 is inverted whereby there is provided 180° to 240° phase shift in its output with respect to the output of oscillator 52 depending upon the action of magnetic amplifier 54.

In magnetic amplifier 54, the output of slave oscillator 52 may be applied to the two gate windings thereof. Applied to its control winding is the voltage appearing at the output of rectifier and filter stage 44 in one direction and, in the opposite direction, the difference voltage produced in a voltage comparator 59 resulting from the comparison of a reference voltage from a reference voltage source 57 and a portion of the output voltage rectified to a unidirectional potential in a rectifier 55. The value of the reference voltage may be so chosen that with a system output voltage at a desired value, a voltage is applied to the control winding of magnetic amplifier 54 such that its core is partially saturated and, thereafter, for it to go to complete saturation, imparts a 30° phase shift to the output of slave oscillator 52. Then, if the system output falls below this desired value, the phase shift imparted by magnetic amplifier 54 will correspondingly decrease, the limit being 0° phase shift and if the system output voltage exceeds this desired value, the phase shift imparted by magnetic amplifier 54 will correspondingly increase. The core of magnetic amplifier 54 is chosen to have a volt-second characteristic such that with the voltages involved, in going from the completely unsaturated to the completely saturated state, it imparts a maximum phase shift of 60°.

Slave oscillators 56, 58 and 60 are similarly connected in circuit as master oscillator 48 and slave oscillators 50 and 52 whereby the outputs of slave oscillators 58 and 60 are 120° and 240° respectively retarded in phase with respect to the output of slave oscillator 56.

The unidirectional output of the high power rectifier and filter stage 40 is applied as the input to six like inversion arrangements comprising the series arrangements of inverters 80 and 81, inverters 82 and 83, inverters 84 and 85, inverters 86 and 87, inverters 88 and 89, and inverters 90 and 91. These inverters may suitably have as switching devices therein silicon controlled rectifiers, transistors, etc. The switching waveform for inverters 80 and 81 is the resultant of the phasorial addition of the outputs of master oscillator 48, slave oscillator 52 and slave oscillator 56. It is readily seen that with no phase shift imparted by magnetic amplifier 54 that the outputs of slave oscillators 52 and 56 when phasorially added, cancel each other and the net switching waveform to inverters 80 and 81 consequently is the output of master oscillator 48, such waveform being, for example, the same as waveform I of FIG. 11. In the event that a phase shift is imparted by the operation of magnetic amplifier 54, 30°, for example, then the resultant of the phasorial addition of these outputs has the form such as waveform J in FIG. 7.

If it is assumed that the waveforms combined to provide the switching waveform to inverters 80 and 81 are the waveforms of FIG. 11, then it is seen that the switching waveform to inverters 82 and 83 which is the resultant of the phasorial addition of the outputs of master oscillator 48, slave oscillator 50 and slave oscillator 58, is 120° displaced in phase with respect to the switching waveform to inverters 80 and 81, i.e., these waveforms having the form shown in FIG. 12. Correspondingly, the switching waveform to inverters 84 and 85 is 120° displaced in phase with respect to the switching waveform to inverters 82 and 83, the waveforms which are phasorially combined having the form shown in FIG. 13.

The switching waveform to inverters 86 and 87 is the waveform applied to inverters 80 and 81 but 30° retarded in phase with respect thereto by the action of phase shift device 62, and the switching waveforms to pairs of inverters 88 and 89, and 90 and 91 respectively are the switching waveforms for pairs of inverters 82 and 83, and 84 and 85 retarded in phase by phase shift devices 64 and 66.

To provide a switching waveform to the inverters, secondary windings of the output transformers of the respective oscillators required to provide the waveform may be connected in series arrangement to provide phasorial addition. The 30° phase shift device such as depicted in block form in stages 62, 64 and 66 may be a saturable device in series arrangement with these three secondary windings and having a core with a volt-second characteristic such that a 30° phase delay is imparted to the resultant of the phasorial addition.

The output transformer section comprises a bank of primary windings designated by the letter Y, and a bank of primary windings designated by the letter Z. To the primary windings of bank Y are applied the outputs of inverters 80, 82 and 84 and the outputs of inverters 81, 83 and 85 and to the primary windings of bank Z are applied the outputs of inverters 86, 88 and 90 and the outputs of inverters 87, 89, and 91.

It is seen in bank Y that a primary winding 67 is connected between the outputs of inverters 80 and 84, a primary winding 68 is connected between the outputs of inverters 80 and 82 and a primary winding 69 is connected between the outputs of inverters 82 and 84. Correspondingly, a primary winding 70 is connected between the outputs of inverters 81 and 85, a primary winding 71 is connected between the outputs of inverters 81 and 83 and a primary winding 72 is connected between the outputs of inverters 83 and 85.

In bank Z, a primary winding 73 is connected between the outputs of inverters 86 and 90, a primary winding 74 is connected between the outputs of inverters 86 and 88 and a primary winding 75 is connected between the outputs of inverters 88 and 90. Correspondingly, a primary winding 76 is connected between the outputs of inverters 87 and 91, a primary winding 77 is connected between the outputs of inverters 87 and 89 and a primary winding 78 is connected between the outputs of inverters 89 and 91. The respective groups of three primary windings 67, 68 and 69, 70, 71 and 72, 73, 74 and 75, and 76, 77 and 78, are all connected in delta configurations to enable the use of E type cores which impart a weight saving. Pairs of primary windings 67 and 70, primary windings 68 and 71, primary windings 69 and 72, primary windings 73 and 76, primary windings 74 and 77, and primary windings 75 and 78 are all respectively wound on single cores.

By connecting a primary winding such as winding 67, between the outputs of inverters 80 and 84, phasor summation of the outputs of these inverters in 60° phase displacement occurs in the winding. Therefore, if the outputs of inverters 80 and 84 are pure square waves, then the output appearing across primary winding 67 is a quasi-square wave such as shown in FIG. 1. If the output of inverters 80 and 84 are notched quasi-square waves such as waveform J in FIG. 7 which results from the imparting of a 30° phase shift by magnetic amplifier 54, then the phasor sum of the outputs of inverters 80 and 84 appearing across primary winding 67 is a wave similar to the waveform of FIG. 2. If a 60°, i.e., a maximum phase shift is imparted by magnetic amplifier 54 to result in an output waveform from inverters 80 and 84 such as waves K and L respectively in FIG. 8, then their phasorial summation in primary winding 67 is equal to zero, thus providing zero output when magnetic amplifier 54 imparts the maximum 60° phase shift. Consequently, the output appearing on each primary winding in banks Y and Z is the resultant of the phasor addition of the outputs of inverters between which they are respectively connected. It is, of course, to be realized that the outputs of the inverters which are applied to the two terminals of a primary winding have to be applied thereto whereby they are 60° displaced in phase with respect to each other. It is readily seen, for example, that if the output of inverter 80 is applied to one terminal of primary winding 67, then the output of inverter 84 applied to the other terminal of winding 67 which is 240° displaced in phase with respect to the output of inverter 80 is inverted at this terminal whereby the voltages applied to the terminals of winding 67 are so 60° displaced in phase.

The connecting of a primary winding between the outputs of two inverters to effect the phasorial addition of their outputs presents the advantage of requiring only one output transformer for both of these inverters the load current being shared by the inverters. This is to be contrasted with an arrangement where each inverter requires its separate output transformer and each of these separate transformers have to be designed to handle the maximum volt-seconds that the respective inverters produce. Also, the use of "up and down" type inverters permits phasorial addition of two phase displaced waves with the single primary winding since these inverters permit voltage regulation with respect to a system reference point without the need for their own respective output transformers.

The placing of two primary windings such as windings 67 and 70 on a single core presents the advantage in that there is forced voltage sharing in these windings. Thus, the switching devices in the inverters need only be rated to handle a voltage equal to the unidirectional potential being switched divided by the number of individual inverters. For example, the switching devices in inverters 80 and 81 need only be rated to handle a voltage of a value equal to one half of the value of the output of stage 40. Each primary winding in such arrangement carries only its fractional share of the voltage.

To provide a quasi-sinusoidal stepped wave, for example, in a phase output such as phase 1, the output appearing in secondary winding 93, the output in secondary winding 96 and the output in secondary winding 99 are phasorially added in the polarities as shown by the designating polarity dots on these secondary windings. The secondary to primary winding turns ratio in the transformers on bank Y are chosen to be $\sqrt{3}$ to 1 and the secondary to primary winding ratios in the transformers of bank Z are chosen to be 1 to 1. Thus, to provide the phase 1 output of the system and considering the phase of the output in secondary winding 93 as being the reference phase, the output appearing across secondary winding 96 is 30° retarded in phase with respect thereto and the output appearing across secondary winding 99 in the polarity as shown by the dot thereon is 30° advanced in phase with respect thereto. Such series connection of these three secondary windings in a situation where no phase shift is imparted by magnetic amplifier 54 results in the quasi-sinusoidal stepped wave P of FIG. 9. In the event that magnetic amplifier 54 imparts a 30° phase shift, for example, then the waveform resulting from this series connection is such as waveform T shown in FIG. 10. The phasorial addition of the other groups of three secondary windings in banks Y and Z provide two like stepped waves, all three of the stepped waves being balanced in phase.

It is thus seen how the arrangement of FIGS. 15–17 enables production of a three phase classic quasi-square wave output such as the waveform in FIG. 1, for example, where triplet harmonics are cancelled, a variably pulse-width modulated quasi-square wave, i.e., notched quasi-square wave wherein such harmonic cancellation is maintained as shown in the waveforms of FIGS. 2 and 3 and the quasi-sinusoidal stepped waves, such as shown in FIGS. 9 and 10 from which many more of the objectionable harmonics have been eliminated. The delta connections of the output primary windings enables the use of E type cores which affect a weight saving and which are advantageously utilized in three phase systems.

It is to be realized that to obtain the system output waveforms as described hereinabove, there need not be utilized both the upper and lower line of inverters as shown in FIGS. 15 to 17. Pairs of inverters are shown to indicate how voltage sharing and load current sharing can be effected by the transformer arrangement in the output transformer section comprising banks Y and Z and how, where "up and down" types of inverters are used, to regulate the voltage with respect to the midpoint of the unidirectional potential source. It is readily appreciated that only one set of inverters such as inverters 80, 82 and 84, or inverters 81, 83 or 85 are required to produce the outputs in the windings of bank Y. Similarly, only one set of inverters such as inverters 86, 88 and 90 or inverters 87, 89 and 91 are required to produce the outputs in the windings of bank Z. Of course, in the latter situation, if only three inverters were used, each transformer would require two like secondary windings in transformer relationship with the primary windings of bank Z in the particular polarities shown for producing the stepped wave outputs as shown in FIGS. 9 and 10.

*Master and slave oscillator*

In FIG. 18, there is schematically depicted an example of a master oscillator and slave oscillator arrangement suitable for use to provide the waveforms which are combined to provide the driving signals to the switching devices in the inverters. In this figure, the master oscillator which may serve as stage 48 of FIGS. 15–17 comprises a pair of transistors 100 and 120 whose emitters 102 and 122 are connected to the positive output terminal of regulator 46 (FIGS. 15–17) and whose collectors 104 and 124 respectively are connected to the terminals of the primary winding 112 of a transformer 110, the midpoint 111 of winding 112 being connected to the negative terminal of the output of regulator 46. Connecting the bases 106 and 126 of the transistors 100 and 120 is a secondary winding 114 of transformer 110, the midpoint 113 of winding 114 being connected to midpoint 111 through a resistor 116 and to the positive terminal through a resistor 118, a capacitor 119 being provided in shunt with resistor 118. Transformer 110 is chosen to be of a saturable type whose core is chosen to have a volt-second characteristic such that with the voltage applied thereto from regulator 46 and the values of the circuit components in the oscillator, a constant frequency having the desired value is obtained.

In operation, transistors 100 and 120 alternately apply the regulated voltage from stage 46 to primary winding 111. Upon the application of such voltage, the voltage divider comprising resistors 116 and 118 biases the base to emitter junctions in both transistors in such a direction as to render them both conducting. However, any small unbalance causes one transistor to become conductive before the other. If it is assumed that transistor 100 is rendered conductive first, the polarity of winding 114 is such that when transistor 100 conducts, the positive voltage applied at the midpoint 113 induces a negative voltage at base 106 with respect to midpoint 113 thereby increasing the conductivity of transistor 100 and holding it conductive until transformer 110 saturates a constant number of volt-seconds later. While transistor 100 is biased in the conductive direction, the reverse polarity occurring in winding 113 is biasing transistor 120 further in the nonconductive direction. When transformer 110 saturates after transistor 100 has been conductive, the base drive for transistor 100 collapses and transistor 120 immediately is rendered conductive. In this manner, transistor 120 supplies the other half cycle of output from the oscillator. Capacitor 119 functions to provide relatively rapid switching of conductivity from one transistor to the other, thereby aiding in the providing a sharp output square wave.

The slave oscillator stage comprises a pair of transistors 130 and 150 whose emitters 132 and 152 are connected to the positive terminal of regulator 46 and whose collectors 134 and 154 are connected to the terminals of a primary winding 142 of a transformer 140, the midpoint 141 of primary winding 142 being connected to the negative terminal of regulator 46. The bases 136 and 156 are connected together by the series arrangement of a resistor 138 and a secondary winding 144 of transformer 140. Bases 136 and 156 are also interconnected by the series arrangement of a resistor 145, a secondary winding 115 of transformer 110 and a volt-second device 146 which may suitably be a saturable reactor, magnetic amplifier or the like. The core of the volt-second device is chosen to have a characteristic such that it imparts a given delay, i.e., phase shift, to the driving signal applied to the slave oscillator by the voltage in winding 115. For example, in slave oscillator 50 of FIGS. 15–17, it would be chosen to impart a 120° delay.

In the operation of the slave oscillator stage, it is seen that since secondary winding 115 of transformer 110 has its polarity dot terminal connected to base 136 of transistor 130 and its other terminal connected to base 156 of transistor 150 through volt-second device 146, when transistor 130 is conducting and when transistor 100 in the master oscillator is concurrently conducting whereby the voltages at all the dot terminals in transformer 110 are positive, volt-second device 146 is unsaturated with respect to current flow therethrough from base 156 to winding 115. Transistor 130 remains conductive until volt-second device 146 saturates a constant number of volt-seconds later at which time the voltage at base 156 goes rapidly in the negative direction and consequently conductivity is rapidly switched from transistor 130 to transistor 150. When conductivity so switches in the slave oscillator, the polarities of the dot terminals of the winding of transformer 140 are all positive. In this manner, if volt-second device 146 is chosen to have a volt-second characteristic which imparts a 120° delay, then the output of the slave oscillator is the same amplitude square wave and having the same frequency as the output of the master oscillator but 120° retarded in phase with respect thereto. If the opposite terminals of the windings of transformer 140 were chosen to be the dot terminals, then the output of the slave oscillator would be 300° retarded in phase with respect to the output of the master oscillator.

The other slave oscillator stages in the system of FIGS. 15–17 are the same as the slave oscillator shown in FIG. 18, the phase shift of their output being determined by the choice of the volt-second characteristic of the volt-second device contained therein and the poling of their respective transformer windings. The transformers in the respective slave oscillators need not be of the saturable type.

In the connection between slave oscillators 52 and 56 through magnetic amplifier 54 in FIGS. 15 to 17, a secondary winding of the output transformer of oscillator 52 has its polarity dot terminal connected to the base of its transistor corresponding to transistor 130 in FIG. 18 and its other terminal connected to the junction of the ends of the gate windings in magnetic amplifier 54. The junction of the other ends of these gate windings is connected to base of the other transistor in slave oscillator 56.

As has been stated hereinabove, it is desired to have a switching arrangement wherein the output voltage which is produced is constrained, i.e., it is controlled by the instantaneous switch positions only and does not depend upon electrical load magnitude and power factor conditions. Such inverters permit the generation of quasi-square waves as shown in FIGS. 1 and 2 without the need for auxiliary switching devices and can permit the elimination of an output transformer. This can be understood when it is realized that the inverters in a vertical row in FIGS. 15 to 17 permit the output to be regulated with respect to a system reference point without the need for an output transformer to provide such reference point. Of course to provide the quasi-sinusoidal stepped wave output as shown in waveforms P and T of FIGS. 9 and 10 respectively, output transformers are required to enable phasor addition.

Only the structure and operation of one inverter will be described since all of the inverters are of the same type.

Thus, in the inverter depicted in FIG. 19, the series arrangement of the anode to cathode path of a silicon controlled rectifier 160, an inductor 170 and the anode to cathode path of a silicon controlled rectifier 180 is connected across the unidirectional potential source. If it is considered to be inverter 80 of FIGS. 15 to 17, then such source is the voltage between the positive terminal and the midpoint of the output of rectifier and filter stage 40 in FIGS. 15 to 17.

Connected across silicon controlled rectifier 160 is the series arrangement of a capacitor 162 and resistor 164 and connected across silicon controlled rectifier 180 is the series arrangement of a capacitor 182 and a resistor 184. Also connected across the unidirectional potential source is the series arrangement of capacitors 166 and 186 and the cathode to anode paths of diodes 168, 169, 188 and 189. The junction 173 of diode 169 and 188, the junction 167 of capacitors 166 and 180 and the midpoint 171 of inductor 170 are joined.

Connected between the gate and cathode electrodes of silicon controlled rectifiers 160 and 180 and still assuming that inverter 80 of FIGS. 15 to 17 is being described, are the series arrangements of respective secondary windings of the output transformers of master-oscillator 48, slave oscillator 52 and slave oscillator 56 whereby with no phase shift imparted by magnetic amplifier 54, the net switching waveform to the gate electrodes of silicon controlled rectifiers 160 is, for example, waveform I in FIG. 11, the polarity dots on the transformer windings indicating that the resultant switching waveforms to silicon controlled rectifiers 160 and 180 are 180° displaced in phase.

If magnetic amplifier 54 imparts a 30° phase shift, for example, than the resultant switching waveforms would be one such as waveform D or E in FIG. 6.

Considering the operation of the inverter of FIG. 19, let it be assumed that silicon controlled rectifier 160 has been gated into conductivity by the positive half cycle of the gating waveform. With silicon controlled rectifier 160 conducting, load current flows from the positive terminal of the source through silicon controlled rectifier 160, the upper half of the inductor 170 to one terminal of primary winding 67 in upper bank Y (FIGS. 15 to 17). During the half cycle that silicon controlled rectifier 160 is conductive, side 167 of commutating capacitor 186 charges to the potential of the positive terminal. At the end of the half cycle of operation, silicon controlled rectifier 180 is gated into conductivity by the negative half cycle of the gating waveform and gating current is simultaneously removed from silicon controlled rectifier 160. At the instant that silicon controlled rectifier 180 is rendered conductive, the full voltage across capacitor 186 appears across the lower half of inductor 170 thus forcing the voltage across this lower half to be instantaneously equal to the unidirectional supply voltage. Because of autotransformer action between the upper and lower halves of center tapped inductor 170, instantaneously the voltage across the entire winding of inductor 170 equals twice the value of the aforesaid supply voltage. Consequently, the anode to cathode voltage across silicon controlled rectifier 160 is reversed and silicon controlled rectifier 160 is commutated into nonconductivity. Now in the succeeding half cycle, i.e., when silicon controlled rectifier 180 is conductive, capacitor 166 charges similarly as had capacitor 186 in the preceding half cycle and when silicon controlled rectifier 160 is again gated into conductivity at the beginning of the next half cycle, the same commutation events ensue as when silicon controlled rectifier 180 was rendered conductive at the beginning of the immediately preceding half cycle. Of course, during the half cycle that silicon controlled rectifier 180 conducts, capacitor 186 becomes discharged and during the half cycle that silicon controlled rectifier 160 conducts, capacitor 166 becomes discharged.

Diodes 168, 169, 188 and 189 enable the return of energy from the load circuit to the supply to enable the inverter to carry reactive loads. The respective series arrangements of capacitor 162 and resistor 164 and capacitor 182 and resistor 184 are connected across silicon controlled rectifiers 160 and 180 in order to absorb any energy in the small leakage inductance from inductor 170 immediately after reverse current through a controlled rectifier has suddenly ceased to flow.

An inverter in FIGS. 15 to 17 which is shown as having a switching waveform applied thereto through a 30° phase shift device has the same structure as that shown in FIG. 19 with the addition of a 30° volt-second device connected in series with the series arrangement of the three secondary windings between the gate and cathode electrodes of silicon controlled rectifiers. Thus, inverter 86 in FIGS. 15 to 17 in which the switching waveform therefor is 30° retarded in phase with respect to the switching waveform for inverter 80, would have the same switching arrangement as shown in FIG. 19 with the respective series arrangements of a like resistor and a 30° volt-second device connected between the gate electrodes of silicon controlled rectifiers 160 and 180 and the secondary windings of transformer 56.

It is seen that with the use of an inverter such as one shown in FIG. 19, switching which is equivalent to the constrained single pole double throw switching without a center-off position as shown in FIG. 4 may be accomplished. The output notched quasi-square waveforms and the choice of the amplitude of the steps in the quasi-sinusoidal stepped wave output waveforms enables both the cancellation of undesirable harmonics and pulse width modulation of the output to enable voltage control independent of the frequency of the output with only one set of switching devices.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. A system for producing a variably notched quasi-square wave while maintaining said wave free of triplet harmonic components comprising means for generating a first square wave, first means in circuit with said generating means for deriving from said first wave a like second wave 120° advanced in phase with respect thereto and a like third wave 60° to 120° variably displaced in phase with respect to said first wave, means in circuit with said generating means and said first deriving means for phasorially adding said waves to produce a first resultant wave, second means for deriving a second resultant wave identical to said first resultant wave but phase displaced from said first resultant wave by a given amount, and means for algebraically adding said first and second resultant waves, said given amount of phase displacement being dimensioned such that said algebraically added waves constitute said notched quasi-square wave.

2. A system for producing balanced polyphase variably notched quasi-square waves while maintaining said waves free of triplet harmonic components comprising means for generating $n$ first like square waves 360/n displaced in phase with respect to each other wherein $n$ is the number of phases, $n$ first means respectively in circuit with each of said generating means for deriving from said first waves, $n$ like second waves 120° advanced in phase with respect thereto and $n$ like third waves 60° to 120° retarded in phase with respect to said first wave, $n$ means respectively in circuit with a corresponding generating means and a first deriving means for phasorially adding corresponding first, second and third waves to produce $n$ first resultant waves, $n$ second means for deriving $n$ like second resultant waves displaced in phase with respect to said corresponding first resultant waves, and $n$ means for algebraically adding corresponding first and second resultant waves to produce added waves, said phase displacements being dimensioned such that said added waves constitute said quasi-square waves.

3. A system for producing balanced three-phase variably notched quasi-square waves while maintaining said waves free of triplet harmonic components comprising means for generating first to sixth like square waves 60° progressively displaced in phase, means in circuit with said generating means for variably further retarding the phase of said second, fourth, and sixth waves from 0 to 60°, first adding means in circuit with said generating means and said phase retarding means for phasorially adding said first, second and fifth waves, for phasorially adding said first, third and fourth waves, and for phasorially adding said third, fifth and sixth waves to produce first, second and third resultant waves, means for deriving first, second and third derived resultant waves displaced in phase with respect to said first, second and third resultant waves, and second means for phasorially adding said first resultant and first derived resultant waves, said second resultant and second derived resultant waves, and said third resultant and third derived resultant waves, said last named phase displacements being dimensioned such that phasorially adding waves constitute and quasi-square waves.

4. A system for converting the output of an alternating current power source to a quasi-square wave system output variably pulse-width modulated in accordance with the deviation of said system output from a desired value while continually maintaining said system output free of triplet harmonic components comprising rectifying means in circuit with said source to produce a unidirectional power supply therefrom, generating means in circuit with a portion of said supply for producing a first reference square wave and second to fifth like square waves having said frequency, said second to fifth waves being respectively 60°, 120°, 240°, and 300° displaced in phase with respect to said first wave, a reference voltage source having a value representing said desired system output, means in circuit with said system output to derive a voltage representative thereof, voltage comparison means, means for applying said reference voltage and said representative voltage to said comparison means to derive a difference voltage therebetween, means for phase shifting said second and fifth waves from 0° to 60° in response to said difference voltage to concurrently variably shift their respective phases in accordance with said difference voltage, means in circuit with said generating means and said phase shift means for phasorially adding said first, fourth and phase shifted second waves, and said third, fourth and phase shifted fifth waves to produce two like resultant waves 240° displaced in phase, a pair of inverters, each containing a pair of complementary switching devices, means for applying said unidirectional potential and one of said resultant waves to each of said inverters respectively, and means in circuit with said inverters for phasorially adding the outputs of said inverters in a 60° phase displacement.

5. A system for converting the output of an alternating current power source to a balanced three-phase quasi-square wave system output of a given frequency variably pulse-with modulated in accordance with the deviation of said system output from a desired value while maintaining said system output free of triplet harmonic components comprising means in circuit with said source to produce a unidirectional power supply, generating means in circuit with a portion of said supply for producing a first reference square wave and second to sixth like square waves having said frequency and progressively 60° displaced in phase with respect thereto, a reference voltage source having a value representing said desired output, means in circuit with said system output to derive a voltage representative thereof, voltage comparison means, means for applying said reference voltage and said representative voltage to said comparison means to derive a difference voltage therebetween, means for phase shifting said second, fourth and sixth waves from 0° to 60° in accordance with said difference voltage, means in circuit with said generating means and said phase shift means for respectively phasorially adding said first, third and phase shifted fourth waves, said first, fifth and phase shifted second waves, and said third, fifth and phase shifted sixth waves, to produce balanced-phase first, second and third resultants, first, second and third like inverters, each of said inverters having a pair of complementary switching devices, means for applying said first, second and third resultant waves as switching waves to said first, second and third inverters respectively while concurrently applying said unidirectional supply to said inverters, and means in circuit with the outputs of said inverters for respectively phasorially adding the outputs of said first and second inverters, the outputs of said first and third inverters, and the outputs of said second and third inverters.

6. A system as defined in claim 5 wherein said A.C. source is a polyphase source and wherein said rectifying means is a polyway rectifier for rectifying and combining the outputs of said source.

7. A system as defined in claim 5 wherein said inverters are of the type wherein their respective switching devices function as single-pole, double-throw switches.

8. The system as defined in claim 5 wherein said means for phasorially adding the outputs of said inverters comprises respective primary transformer windings connected between the outputs of pairs of additive inverters.

9 A system as defined in claim 8 where each of said inverters comprises a pair of like inverting stages, each of said inverting stages having a pair of complementary switching devices and being of the type wherein their respective switching device function as single-pole double-throw switches, said unidirectional potential being applied across respective series arrangements of said pairs of stages.

10. A system for converting the output of an alternating current power source to a voltage regulated quasi-sinusoidal stepped wave system output having a given frequency and being free of triplet and other harmonic components comprising: rectifying means in circuit with said source for producing a unidirectional power supply, generating means in circuit with a portion of said supply for producing a first reference square wave having said frequency and second to sixth like square waves respectively progressively 60° displaced in phase with respect to said first wave, a reference voltage having a value representing said desired system output, means for deriving from the system output voltage, a voltage representative thereof, voltage comparison means, means for applying said reference voltage and said representative voltage to said comparison means to drive a difference voltage therebetwen, first means for phase shifting said second, fourth and sixth waves from 0° to 60° in accordance with said difference voltage, first adding means in circuit with said generating means and said phase shift means for phasorially adding said first, fifth and phase shifted second waves, said first, third and phase shifted fourth waves, and said third, fifth and phase shifted sixth waves to produce balanced phase, first, second and third resultants, second means for producing a 30° phase shift, means for applying said resultant waves to said second means to produce first, second and third 30° phase shifted resultant waves, first to sixth like inversion means, each including a pair of complementary switching devices, means for applying as switching waveforms to said first, second and third inversion means, said first, second and third resultant waves and as switching waveforms to said fourth, fifth and sixth inversion means, said first, second and third phase shifted resultant waves, means for applying said unidirectional potential to said inversion means to produce a first reference power wave and second to sixth like power waves respectively 30°, 120°, 150°, 240° and 270° displaced in phase with respect to said first power wave, second adding means in circuit with said inversion means for phasorially adding in 60° phase displacement, said first and fifth power waves to produce a first quasi-square power wave, said second and sixth power waves to produce a second quasi-square power wave, said second and fourth power waves to provide a third quasi-square power wave, means in circuit with said second adding means for producing a first derived quasi-square power wave having a value $\sqrt{3}$ times the value of said first quasi-square power wave, and means in circuit with said derived power wave producing means and said second adding means for phasorially adding said first derived quasi-square power wave with said second and third power waves in a phase relationship such that said second and third power waves are respectively 30° advanced in and 30° retarded in phase with said derived power wave.

11. A system for converting the output of an alternating current power source to a voltage regulated balanced three-phase quasi-sinusoidal stepped wave system output having a given frequency and being free of triplet and other harmonic components comprising: rectifying means in circuit with said source to produce a unidirectional power supply, generating means in circuit with a portion of said supply for producing a first reference square wave and second to sixth like square waves having said frequency and being respectively progressively 60° displaced in phase, a reference voltage source having a value representing a desired system output, means in circuit with said system output for deriving a voltage representative thereof, voltage comparison means, means for applying said reference voltage and said representative voltage to said voltage comparison means to derive a difference voltage therebetween, first phase shift means for phase shifting said second, fourth and sixth waves from 0° to 60° in accordance with said difference voltage, first adding means in circuit with said generating means and phase shift means for phasorially adding said first, fifth and phase shifted second waves, said first, third and phase shifted fourth waves and said third, fifth and phase shifted sixth waves to produce balanced phase first, second and third resultant waves, second means for producing a 30° phase shift, means for applying said resultant waves to said second phase shift means to produce first, second and third 30° phase shifted resultant waves, first to sixth like inversion means, each of said inversion means including at least a pair of complementary switching devices, means for applying said first, second and third resultant waves as switching waves to said first, second and third inversion means and for applying said first, second and third phase shifted resultant waves as switching waves to said fourth, fifth and sixth inversion means, means for applying said unidirectional potential to said inversion means to produce a first reference power wave and second to sixth like power waves 30°, 120°, 150°, 240° and 270° displaced in phase with respect to said first power wave, second adding means in circuit with the outputs of said conversion means for phasorially adding in 60° phase relationship, said first and third power waves, said first and fifth power waves, said third and fifth power waves, said second and sixth power waves, said second and fourth power waves, and said fourth and sixth power waves to produce first to sixth quasi-square power waves displaced in phase correspondingly as said first to sixth power waves, means in circuit with said second adding means for producing first, second and third derived quasi- square power waves having $\sqrt{3}$ times the value of said first, second and third quasi-square power waves and third adding means in circuit with the output of said derived quasi-square power waves producing means and said second adding means for phasorially adding said first derived quasi-square power wave to said fourth and fifth quasi-square waves, said second derived quasi-square power wave to said fifth and sixth quasi-square power waves and said third derived quasi-square power wave to said fourth and sixth quasi-square power waves, said quasi-square power waves being added to a corresponding derived quasi-square power wave respectively in a phase 30° advanced and 30° retarded with respect thereto.

12. A system as defined in claim 11 wherein said means for adding the outputs of said inverters comprises respective transfromer primary windings connected between the outputs of additive inverters and wherein the means for producing said derived quasi-square waves comprises first, second and third secondary windings in transformer relationship with the primary winding between said outputs of said first, second and third inverters, the respective transformer related windings having a $\sqrt{3}$ to 1 secondary to primary winding turns ratio.

13. A system as defined in claim 12 wherein each of said inversion means comprises the series arrangement of two like inverting stages each containing a pair of complementary switching devices, the same switching wave being applied to both stages and wherein said unidirectional potential source is applied across said series arrangement.

14. A system as defined in claim 13 wherein said inversion means are of the type wherein the switching devices therein function as single-pole double-throw switches.

15. A system as defined in claim 14 wherein said third adding means comprises the series arrangement of a secondary winding having a derived quasi-square power wave therein, a secondary winding having a power wave 30° advanced in phase with respect thereto and a secondary winding having a power wave 30° retarded in phase with respect thereto.

16. A system as defined in claim 11 wherein said primary windings between the outputs of said first, second and third inverters are delta connected and wherein the primary windings of said fourth, fifth and sixth inverters are delta connected.

17. A system as defined in claim 11 wherein said alternating current source is a polyphase source and wherein said rectifying means is a polyway full-wave rectifier.

18. An arrangement for inverting a unidirectional wave into an alternating wave of a predetermined frequency comprising a source of a first alternating notched output wave of said predetermined frequency, said notched wave comprising a pair of non-overlapping rectangular pulses in each half cycle, each of the pulses in said pair having its center line phase delayed by 60 degrees and 120 degrees respectively from the start of its respective half cycle, means for producing a second and third alternating notched wave which is phase advanced and phase retarded by 30 degrees respectively with respect to said first alternating notched wave, means for combining said first, second and third waves to produce a resulting alternating wave of stepped configuration, a source of a control signal, and controlling means responsive to said control signal for controlling the amplitude of the fundamental frequency component of said resulting wave, said controlling means comprising means for concurrently varying the width of said pulses in each pair symmetrically with respect to their centerlines and without permitting them to overlap in accordance with said control signal.

19. An arrangement for inverting unidirectional potential into three phase alternating potential of a predetermined frequency comprising means for producing a first resulting alternating wave of stepped configuration, said first means comprising a source of a first alternating notched output wave of said predetermined frequency, said notched wave comprising a pair of non-overlapping rectangular pulses in each half cycle, each of the pulses in said pair having its center line phase delayed by 60 degrees and 120 degrees respectively from the start of its respective half cycle, means for producing a second and third alternating notched wave which is phase advanced and phase retarded by 30 degrees respectively with respect to said first alternating notched wave, means for combining said first, second and third waves to produce a first resulting alternating wave of stepped configuration, second means and third means for producing respectively a second and a third resulting alternating wave of stepped configuration identical to said first resulting voltage wave, means for providing a phase displacement of 120 electrical degrees between said first, second and third resulting waves and means for concurrently controlling the width of said pulses in each pair symmetrically with respect to their center lines and without permitting them to overlap one another.

20. An arrangement for converting the output of a unidirectional potential source to a balanced three-phase quasi-square wave system output of a given frequency while minimizing undesirable harmonic components in the output comprising generating means in circuit with a portion of said supply for producing a first reference square wave and second to sixth like square waves progressively 60° displaced in phase and having said given frequency, means for shifting the phase of said second, fourth and sixth waves, means for respectively algebraically combining the first, third and fourth waves, the first, second and fifth waves, and the third, fifth and sixth waves to produce balanced phase first, second and third resultant waves, first, second and third inverters means for coupling said unidirectional potential source to said inverters, means for applying said first, second and third resultant waves as switching waveforms to respective inverters for inverting the coupled unidirectional potential to square power waves, means for respectively algebraically combining the outputs of said first and second inverters, the outputs of the first and third inverters, and the outputs of the second and third inverters to produce three like balanced phase quasi-square wave outputs.

21. An arrangement according to claim 20 wherein said means for algebraically combining comprises a transformer winding and means for applying the respective inverter outputs to opposite ends of said winding.

22. An arrangement for converting the output of a unidirectional potential source to a balanced three-phase quasi-sinusoidal stepped wave output having a given frequency while minimizing undesirable harmonic components in the output comprising generating means in circuit with a portion of said supply for producing a first reference square wave and second to sixth like square waves having the aforesaid given frequency and being respectively progressively 60° displaced in phase, means for shifting the phase of said second, fourth and sixth waves, means for algebraically combining the first, second and fifth waves, the first, third and fourth waves and the third, fifth and sixth waves to produce balanced-phase first, second and third resultant waves, means for shifting the phases of said resultant waves by 30° to produce first, second and third 30° phase shifted resultant waves, first to sixth like inversion means, means for coupling said unidirectional potential source to all of said inversion means, means for applying said first named three resultant waves as switching waves to the first, second and third inversion means and the three phase shifted resultant waves as switching waves to the fourth, fifth and sixth inversion means respectively to provide a first reference power wave and second to sixth like power waves 30°, 120°, 150°, 180°, 240°, and 270° displaced in phase with respect to said first power wave, means for algebraically combining the first and third, the first and fifth, the third and fifth, the second and fourth, the second and sixth and the fourth and sixth power waves to produce first to sixth quasi-square power waves displaced in phase correspondingly as the first to sixth power waves, means responsive to said first, second and third quasi-square power waves for producing first, second and third derived quasi-square power waves having $\sqrt{3}$ times the value of the first, second and third quasi-square power waves, means for algebraically combining the first derived quasi-square power wave and the fourth and fifth quasi-square power waves, the second derived quasi-square wave and the fifth and sixth quasi-square power waves and the third derived quasi-square power wave and the fourth and sixth quasi-square power waves to provide said quasi-sinusoidal stepped wave output.

References Cited

UNITED STATES PATENTS 3,215,860 11/1965 Neuman ---------- 307—88.5

FOREIGN PATENTS 155,584 2/1939 Austria.

JOHN F. COUCH, *Primary Examiner.*

W. H. BEHA, *Assistant Examiner.*